United States Patent Office 2,780,547
Patented Feb. 5, 1957

2,780,547
DIAZOTYPE PHOTOPRINTING MATERIALS AND PROCESSES FOR PREPARING SAME

Anthony J. Ferzola, Brooklyn, N. Y., and Carl Botkin, Teaneck, N. J., assignors to Charles Bruning Company Inc., a corporation of Delaware No Drawing. Application June 30, 1954,
Serial No. 440,556

16 Claims. (Cl. 96—75)

This invention relates to diazotype photoprinting materials and processes for preparing them.

Diazotype photoprinting materials comprising a light-sensitive layer containing a light-sensitive diazo compound on a backing of paper or cloth are known. In one type of such material, the so-called one-component diazotype photoprinting material, the light-sensitive diazo compound is decomposed by light to render it incapable of coupling with an azo coupling component, so that after exposure, e. g. under line drawings or photographic diapositives to be reproduced, an image can be developed by causing the residual diazo compound to couple with an azo coupling component applied, for example, in the developing solution.

In another type of such material, the so-called two-component material, the light-sensitive layer contains both the light-sensitive diazo compound and the azo coupling component, which are stabilized against premature coupling. In the latter-type material, the development is effected by subjecting the material to an alkaline environment, e. g., by exposure to alkaline vapor such as ammonia or a volatile organic nitrogen compound, or by exposure to an aqueous alkaline solution.

Other diazotype materials employ light-sensitive layers in which diazo compounds are used which permit development of the image in other ways. Thus in the case of materials using light-sensitive diazo sulfonates, development of the image by coupling with an azo coupling component may be effected by exposure to heat or steam.

All of the foregoing diazotype materials result in prints which are objectionable for a number of reasons, among which may be mentioned that the prints are of an uneven and grainy character and are of relatively poor dye density.

In an endeavor to improve such diazotype photoprinting material it has been proposed to add colloidal silica or suspensions of non-colloidal silica to the base material by pre-coating it with an aqueous dispersion of the silica and drying before sensitization, or alternatively to include the silica in the sensitizing solution applied to the base. The use of silica in the positive diazotype printing material frequently results in the discoloration of whites and tends to produce offshade prints in one-component material. Furthermore, non-colloidal silica suspensions are prone to settle out with consequent difficulties in the production of the photoprinting material and tend to rub off or crock on contact with other materials.

It is an object of the present invention to provide improved diazotype photoprinting material which will result in prints or copies of improved smoothness and increased dyeline density. Other objects and advantages of the present invention will be apparent from the following detailed description thereof.

In accordance with the present invention, the base, which may be sized paper or cloth, is treated, either prior to or simultaneously with the application of the sensitizing solution, with a non-cooked and non-swollen dispersion of rice starch in an aqueous medium at a temperature not exceeding 125° F., desirably at room temperature (about 75° F.). The amount of rice starch thus applied should be from 0.5 to about 5, preferably from 1 to 3 grams per square meter of surface.

Surprisingly, we have found that non-cooked and non-swollen rice starch thus applied to the base imparts thereto the property of resulting in prints of vastly improved smoothness and dyeline density. This is due not only to the fact that the non-cooked, non-swollen rice starch dispersion modifies the surface of the paper, cloth, or other base by filling in the voids and covering the fibres, thereby producing a more uniform surface, but also because the rice starch does not result in a material reduction in dye color. Whereas other fillers such as clays, titanium dioxide, Baryta etc. cause a pigmentation, i. e., dilution of the dye color, with resulting loss of dye density and print contrast, surprisingly the non-cooked and non-swollen rice starch applied as a dispersion in an aqueous medium at a temperature not exceeding 125° F. results in a marked improvement in the density of the dyeline. The use of colloidal silica and suspension of non-colloidal silica is prone to cause discoloration of the background, an objection which is overcome by the use of rice starch in accordance with our invention. As compared with other starches such as tapioca and wheat starch, the use of rice starch unexpectedly results in a marked improvement in color density.

As the base for the diazotype photoprinting material, paper commonly known as "direct process paper" or filled or sized cloth such as "blueprint" cloth may be used. The papers mentioned are surface-sized papers usually sized with starch or glue as is well known in the paper making art.

While this invention comprehends diazotype photoprinting material in which the base is treated with a non-cooked, non-swollen rice starch alone, it is preferred to use, along with the rice starch, a binder. For this purpose, any binder can be used which will bond the rice particles to each other, and to the base, which is compatible with the sensitizing solution, which does not interfere with the subsequent coupling, does not result in removal of pigment or color from the base during development, and does not change the fastness of the dye. Preferred binders for diazotype photoprinting materials are polyvinyl acetate emulsions. Other binders which may be used are methyl celulose (Methocel), carboxymethyl cellulose, polyvinyl alcohols, polyvinyl pyrollidone, gums such as gum arabic and gum tragacanth, alginates (Kelgins), acrylic emulsions (Rhoplexes), gelatin, glues, caseinates, water soluble styrene polymers and cooked starches.

The ratio of rice starch to binder will depend, in part at least, on the nature of the binder selected. In general, from 1 to 20 parts of rice starch may be employed per part of binder. The aqueous dispersion should preferably contain from 10 to 20% by weight of non-cooked, non-swollen rice starch.

As the light sensitive diazo compound, any of the known compounds employed in the production of diazotype photoprinting materials may be used. Examples of such compounds are diazonium compounds obtained by diazotization of the following amines:

3-chloro-4-diethylamino-aniline
2-amino-5-dimethylamino-benzoic acid
p-Amino-diphenylamine
N-$\beta$-hydroxyethyl-N-methyl-p-phenylenediamine
N-$\beta$-hydroxyethyl-N-ethyl-p-phenylenediamine
N-benzyl-N-ethyl-p-phenylenediamine
N,N-di-($\beta$-hydroxyethyl)-p-phenylenediamine
p-Phenylenediamine
p-Ethylamino-m-toluidine
p-Dimethylamino-o-toluidine p-Diethylamino-o-phenetidine
p-(N-ethyl-N-β-hydroxyethylamino)-o-toluidine
p-Diethylamino-aniline
p-Dimethylamino-aniline
4-benzoylamino-2,5-diethoxyaniline
p-Di-β-hydroxyethylamino-o-chloroaniline
p-Ethylamino-aniline
2,5-diethoxy-4-(4'-ethoxyphenylamino)-aniline Diazonium compounds obtained from the above amines, in the form of their stable diazonium sulfates, or borofluorides, or in the form of the double salts of the diazonium chloride with zinc chloride, cadmium chloride or stannic chloride.

Coupling components suitable for use in the sensitizing compositions or in the diazotype light-sensitive layer may be any of the following:

1-(sulfophenyl)-3-methyl-pyrazolone-5
p-Sulfo-acetoacetanilide
1,8-dihydroxynaphthalene-3,6-disulfonic acid
2,3-dihydroxy naphthalene
2,3-dihydroxy naphthalene-6-sulfonic acid
β-Hydroxyethylamide of 2-hydroxy-3-naphthoic acid
β-Naphthol
Resorcinol-5-sulfonic acid
Phloroglucinol carboxylic acid
2,4,4'-trihydroxy-biphenyl-2'-sulfonic acid
2-naphthol-3,6-disulfonic acid
Resorcinol
Phloroglucinol
2,2', 4,4'-tetrahydroxy-biphenyl The foregoing coupling components can be employed alone or in combinations of two or more to obtain the desired image coloration.

The following examples are given for purposes of illustration only. It will be understood that the invention is not limited to these examples.

*Example I*

A suspension is made by mixing 20 parts of non-cooked, non-swollen rice starch with 10 parts polyvinyl acetate emulsion in 100 parts water at a temperature of 75° F. The mix is kept from excessive settling by circulating it. It is applied to a starch sized direct process paper by a coating roll in amount of 15 grams per square meter and so that a uniform distribution of the starch is obtained, thus depositing 3 grams of the rice starch per square meter of the paper. The coating is then dried and sensitized with the following solution:

2.5% chlorostannate of p-diazodiethyl-aniline
1.0% alum
2.0% thiourea
2.0% ammonium oxalate
0.1% saponin the rest being water.

Prints are made by exposure of the above coated paper to light under a translucent original and then developed with an alkaline type developer containing:

50 gm. borax
25 gm. sodium carbonate
20 gm. thiourea
8 gm. phloroglucinol
8 gm. resorcinol
30 gm. mannitol
2 gm. sodium salt of isopropylnaphthalenesulphonic acid dissolved in 1000 gms. of water.

Papers thus prepared give black images on a white background which have substantially better density and smoothness than papers sensitized and developed in exactly the same way except that no rice starch is used.

*Example II*

A precoat of rice starch and polyvinyl acetate is applied as in Example I and the resulting paper is then sensitized by application of the following solution:

1.4% N-N-diethylaniline-p-diazonium chloride-zinc chloride double salt
4.0% 2,3-dihydroxynaphthalene-6-sulfonic acid
5.0% diethylene glycol
3.3% citric acid
5.0% zinc chloride
5.0% thiourea
0.1% saponin the rest being water.

When developed with $NH_3$ vapor the sensitized paper gives a blue color which is brighter and more dense than paper not processed in accordance with this invention but sensitized with the same solutions under the same conditions.

The use of "blueprint" cloth instead of paper in the above example gives the same improvement in dyeline density.

*Example III*

Paper is pre-coated with a solution containing:

20 gm. rice starch
1.5 gm. sodium caseinate dissolved in 100 ml. water.

It is then sensitized as in Examples I and II with results that are superior to similar paper not containing rice starch.

The following examples demonstrate that by incorporating the rice starch in the sensitizing solution the same improvement is attained in the diazotype photoprinting material.

*Example IV*

A sensitizing solution is made up as follows:

1.6% nitrate of paradiazoethyl-benzylaniline
1.0% alum
2.0% ammonium oxalate
0.1% gelatin Dilute to 100 ml. water.

To this is added 15 gm. rice starch and 8 ml. of a polyvinyl acetate emulsion containing 50% by weight of solids. A paper is coated with this solution in the same manner as in Example I, and developed with developer of following type:

80 gm. borax
50 gm. dextrose
20 gm. sodium thiosulphate
10 gm. orcinol
20 gm. thiourea
1 gm. sodium salt isopropylnaphthalenesulphonic acid in 1000 gms. water.

Prints thus prepared are brown and of superior shade and coating quality than those made with the same solution without rice starch.

*Example V*

An aqueous solution consisting of:

2.1% 4 - benzoylamino - 2,5 - diethoxybenzene diazonium chloride zinc chloride double salt
1.5% tartaric acid
1.0% gum arabic
12.0% rice starch, the rest being water, is coated on paper or cloth and then developed with:

2.0% thiourea
0.4% phloroglucinol
0.01% acetoacetanilide
0.25% benzoic acid
1.4% sodium benzoate 5.0% sodium citrate
0.1% sodium salt of isopropylnaphthalenesulfonic acid,
the rest being water.

Prints made in this way have a black dyeline of superior smoothness and density.

*Example VI*

Paper is sensitized by application of an aqueous solution of:

3.0% zinc chloride double salt of 3 chloro-4-diethylamino benzene diazonium chloride
2.0% tartaric acid
1.0% boric acid
0.2% gelatin
10.0% rice starch
5.0% polyvinyl acetate emulsion (50% solids)

the rest being water.

Prints made on this paper, developed with the formula listed in Example I, show excellent smoothness, density and contrast when compared with a similar coating in which the rice starch is omitted.

It will be noted that aqueous dispersions of non-cooked, non-swollen rice starch have little or no tendency to settle out and hence its use does not involve the settling difficulties involved in the use of aqueous suspensions of non-colloidal silica. Moreover, prints made in accordance with this invention have markedly less tendency to rub off or crock on contact with other materials as compared with prints made employing a paper or other base treated with a non-colloidal silica dispersion. As compared with paper or other bases treated with colloidal silica the photoprinting material of this invention results in prints of improved dyeline density.

Since certain changes in carrying out the above described process and certain modifications in the photoprinting material embodying this invention may be made without departing from the scope of the invention, it is intended that all matter contained in the above description shall be interpreted as illustrative, and not in a limiting sense.

What is claimed is:

1. A process for preparing diazotype photoprinting material, which process comprises applying to the base of said material an aqueous dispersion of non-cooked, non-swollen rice starch particles at a temperature below 125° F. to produce a coating of said rice starch particles uniformly distributed over said base and also applying to said base a diazotype sensitizing composition containing a light-sensitive diazo compound uniformly and completely covering said rice starch particles.

2. A process for preparing diazotype photoprinting material, which comprises pre-coating a base with an aqueous dispersion of non-cooked, non-swollen rice starch particles at a temperature not exceeding 125° F., drying the coated base, and thereafter applying thereto a diazotype sensitizing composition containing a light-sensitive diazo compound to uniformly and completely cover said rice starch particles.

3. A process as defined in claim 2, in which the diazotype sensitizing composition also contains a coupling component for said diazo compound.

4. A process as defined in claim 2, in which said aqueous dispersion contains a binder, inert to said diazo compound, for bonding the rice starch particles to each other and to said base.

5. A process for preparing diazotype photoprinting material, which comprises applying to a paper base an aqueous dispersion containing a light-sensitive diazo compound, non-cooked and non-swollen rice starch particles, and a binder for the starch particles and for bonding the starch particles to said paper base, which binder is inert to the light-sensitive diazo compound, and thereafter drying the thus coated base.

6. A process as defined in claim 5, in which the binder is a polyvinyl acetate emulsion.

7. A process as defined in claim 5, in which the dispersion applied to the paper base also contains a coupling component for said diazo compound.

8. A process for preparing diazotype photoprinting paper, which comprises pre-coating a starch-sized paper base with an aqueous dispersion of non-cooked and non-swollen rice starch particles at a temperature below 125° F. to produce a coating of said rice starch particles uniformly distributed over said starch-sized paper base and adhering thereto and also applying to said starch-sized paper base a diazotype sensitizing composition containing a light-sensitive diazo compound so as to uniformly and completely cover said rice starch particles with said sensitizing composition.

9. Diazotype photoprinting material which comprises a base having applied thereto a dispersion of non-cooked and non-swollen rice starch particles in an aqueous medium to produce a surface coating thereon of said non-cooked and non-swollen rice starch particles uniformly distributed over said base and adhering thereto, said rice starch particles being covered with a sensitizing composition containing a light-sensitive diazo compound.

10. Diazotype photoprinting material which comprises a base having applied thereto a dispersion of non-cooked and non-swollen rice starch particles in an aqueous medium to produce a surface coating thereon of said non-cooked and non-swollen rice starch particles uniformly distributed over said base and adhering thereto, said rice starch particles being covered with a mixture consisting essentially of a light-sensitive diazo compound and a coupling component for said diazo compound.

11. Diazotype photoprinting material which comprises a paper base having its surface coated with a dispersion of non-cooked and non-swollen rice starch particles in an aqueous medium, which dispersion is applied in amount to leave on said paper base from 0.5 to 5 grams of said rice starch particles per square meter of surface uniformly covering the surface of said paper base and said rice starch particles being covered with a sensitizing composition containing a light-sensitive diazo compound.

12. Diazotype photoprinting material which comprises a paper base having its surface coated with a dispersion consisting essentially of a binder and non-cooked, non-swollen rice starch particles dispersed in an aqueous medium, which coating fills the voids and covers the fibers of the paper base and is uniformly distributed over the surface of the paper base, said rice starch particles being covered with a sensitizing composition containing a light-sensitive diazo compound.

13. Diazotype photoprinting material which comprises a paper base having applied thereto a dispersion of non-cooked and non-swollen rice starch particles in an aqueous medium, said dispersion being applied in amount to leave on said paper base from 1 to 3 grams of said rice starch particles per square meter of paper surface uniformly covering the surface and forming a surface coating on said paper base, said rice starch particles being covered with a sensitizing composition containing a light-sensitive diazo compound.

14. Diazotype photoprinting material which comprises a starch-sized paper base having applied thereto a dispersion of non-cooked and non-swollen rice starch particles in an aqueous medium to produce a surface coating thereon of said non-cooked and non-swollen rice starch particles uniformly distributed over said starch-sized paper base and adhering thereto, said rice starch particles being covered with a sensitizing composition containing a light-sensitive diazo compound.

15. Diazotype photoprinting material as defined in claim 12, in which the binder is a polyvinyl acetate emulsion.

16. Diazotype photoprinting material as defined in claim 13, in which said surface coating also contains a coupling component for said diazo compound.

References Cited in the file of this patent

UNITED STATES PATENTS

| | | |
|---|---|---|
| 2,066,918 | Von Poser | Jan. 5, 1937 |
| 2,113,193 | De Boer | Apr. 5, 1938 |
| 2,616,803 | Ravich | Nov. 4, 1952 |
| 2,617,727 | Slifkin | Nov. 11, 1952 |

FOREIGN PATENTS

| | | |
|---|---|---|
| 573,975 | Great Britain | Dec. 14, 1945 |